United States Patent
Hanov et al.

(10) Patent No.: US 8,488,628 B2
(45) Date of Patent: Jul. 16, 2013

(54) APPARATUS, AND ASSOCIATED METHOD, FOR SELECTING AND NEGOTIATING FRAME SIZE OF COMMUNICATION DATA COMMUNICATED IN A RADIO COMMUNICATION SYSTEM

(75) Inventors: Steve Michael Hanov, Waterloo (CA); Charles Wang, Waterloo (CA)

(73) Assignee: Research In Motion Limited, Waterloo (CA)

( * ) Notice: Subject to any disclaimer, the term of this patent is extended or adjusted under 35 U.S.C. 154(b) by 617 days.

(21) Appl. No.: 11/762,858

(22) Filed: Jun. 14, 2007

(65) Prior Publication Data
US 2008/0310448 A1    Dec. 18, 2008

(51) Int. Cl.
*H04J 3/16*    (2006.01)
(52) U.S. Cl.
USPC ............................. 370/470; 370/331; 370/474
(58) Field of Classification Search
USPC .................. 370/333, 331, 470, 474; 709/236, 709/203, 235
See application file for complete search history.

(56) References Cited

U.S. PATENT DOCUMENTS

| | | | |
|---|---|---|---|
| 6,661,782 B1 | 12/2003 | Mustajaervi | |
| 7,096,274 B1* | 8/2006 | Ci et al. | 709/236 |
| 2002/0091853 A1* | 7/2002 | Moore et al. | 709/236 |
| 2004/0008664 A1* | 1/2004 | Takahashi et al. | 370/351 |
| 2005/0041635 A1* | 2/2005 | Chung et al. | 370/351 |
| 2005/0185619 A1* | 8/2005 | Niemela et al. | 370/331 |
| 2006/0168313 A1* | 7/2006 | Robinson | 709/236 |
| 2007/0202891 A1* | 8/2007 | Diachina et al. | 455/458 |
| 2007/0281697 A1* | 12/2007 | Davis | 455/436 |
| 2008/0062924 A1* | 3/2008 | Kasapidis | 370/331 |
| 2008/0107026 A1* | 5/2008 | Backman | 370/235 |
| 2008/0244084 A1* | 10/2008 | Dierks et al. | 709/236 |

FOREIGN PATENT DOCUMENTS
| | | |
|---|---|---|
| EP | 1517511 A1 | 3/2005 |
| WO | 2006050753 A1 | 5/2006 |

* cited by examiner

*Primary Examiner* — Jason Mattis

(57) ABSTRACT

Apparatus, and an associated method, for negotiating an LLC frame size for a UMA/GAN network. A calculator, embodied at a mobile station, calculates an optimal frame size, i.e., an N201-U value. A negotiation initiator initiates a frame size negotiation with a network entity. The frame size negotiation utilizes the calculated optimal frame size. And, a frame size is allocated responsive to the negotiation. The allocated frame size is used in the formation of user data packets that are constrained to be of sizes that are close to the allocated N201-U value, defined at the LLC layer.

15 Claims, 4 Drawing Sheets

APPARATUS, AND ASSOCIATED METHOD, FOR SELECTING AND NEGOTIATING FRAME SIZE OF COMMUNICATION DATA COMMUNICATED IN A RADIO COMMUNICATION SYSTEM

The present invention relates generally to a manner by which to select a frame size of a frame into which communication data is formatted. More particularly, the present invention relates to apparatus, and an associated method by which to calculate, at a wireless device, an optimal frame size and to initiate negotiation, by the wireless device, of the frame size.

When used pursuant to rove-in of a UMA/GAN (Unlicensed Mobile Access/Generic Access Network)-capable mobile station from a 3GPP-compliant network to a UMA/GAN, improved throughput and efficiency of communications is provided. The mobile station, e.g., calculates an optimal N201-U value and uses the values in XID negotiations, initiated at the mobile station.

BACKGROUND OF THE INVENTION

Advancements in radio communication technologies have permitted the development and deployment of many types of radio communication systems, providing for new types of radio communication services, at lowered costs, and at greater communication throughputs. Increasing numbers of users make regular use of radio communication systems through which to communicate pursuant to performance of many varied communication services, and their use is becoming an increasingly pervasive aspect of every day life.

Exemplary radio communication systems include, for instance, cellular communication systems, WLAN (Wireless Local Area Network) systems, and WiFi (Wireless Fidelity) network systems. Each of these exemplary systems provide for radio communications with wireless devices, referred, variously, as mobile stations, mobile nodes, access terminals, etc. The wireless devices regularly are of dimensions and weights permitting of their portability. That is to say, a user need not be positioned at a fixed location at which the wireless device is positioned to permit its use. Rather, the wireless device is typically, readily moveable between different locations to be operated pursuant to performance of communication services at the different locations as well as, also, operated as the wireless device is carried between the different locations. A wireless device must, of course, be constructed to permit its operation to communicate by way of a particular communication system. Operating standards promulgated by standard-setting bodies define, for many such radio communication systems, operational capabilities, procedures, and protocols pursuant to which the wireless devices must conform in order to permit their use pursuant to performance of a communication service.

As successive generations of operating standards proliferate, a wireless device is sometimes constructed to be operable in conformity with multiple communication standards associated with a single radio communication system-type. And with convergence of communication technologies increasingly permits similar, or identical, communication services are increasingly able to be performed by different communication system-types. And, correspondingly, there is demand for wireless devices capable of communicating by way of more than one communication system-type. For instance, a multi-mode device capable of communicating by way of both a cellular communication system network and by way of a WiFi network provides a user with the capability of communicating by way of both a cellular communication system and by way of a WiFi network. Other multi-mode, wireless devices provide a user with the ability to communicate by way of other combinations of communication systems.

Operating procedures and protocols have promulgated, and others are undergoing promulgation, with respect to various aspects of interoperability between different communication systems. Interoperability between systems provides, for instance, procedures related to seamless transfer of communications between the respective communication systems. UMA/GAN (Unlicensed Mobile Access/Generic Access Network) standard promulgations, e.g., provide for seamless roaming operations and communication handovers between 3GPP ($3^{rd}$ Generation Partnership Project), cellular based stations and IP (Internet Protocol) networks. IP networks include, for instance, the aforementioned WiFi network systems. While the existing promulgation provides for communication of data frames, an existing promulgation fails to provide for efficient segmentation of data. Such inefficiency reduces the communication efficiency and corresponding communication throughput capabilities during performance of a communication service. In particular, in a UMA/GAN system, layer 3 packets are forwarded over an IP connection using UMA/GAN protocols. As in cellular-system counterparts, application level data is segmented into SNDCP frames, and the SNDCP frames are packaged into LLC frames. An LLC frame is of a maximum size of an N201-U value, specified in the 3GPP operating specification. By default, such value is 500 bytes. And, in a UMA/GAN system, a user-data, LLC frame is packaged into one GA-PSR-UNIT-DATA frame, and each of such frames is sent over an IP link via a UDP packet. The use of a low N201-U value, e.g., the 500 byte size value, is additionally inefficient as each application layer packet may be segmented into several SNDCP frames. With the addition of multiple levels of packet headers, significant amounts of overhead is required, resulting in communication inefficiencies.

If a manner could be provided by which more efficiently to provide for the communication of the data, such as through use of larger frame-sizes, improved communication efficiencies and throughput would be permitted.

It is in light of this background information related to communication of data in a radio communication system that the significant improvements of the present invention have evolved.

DETAILED DESCRIPTION

Figure 1:
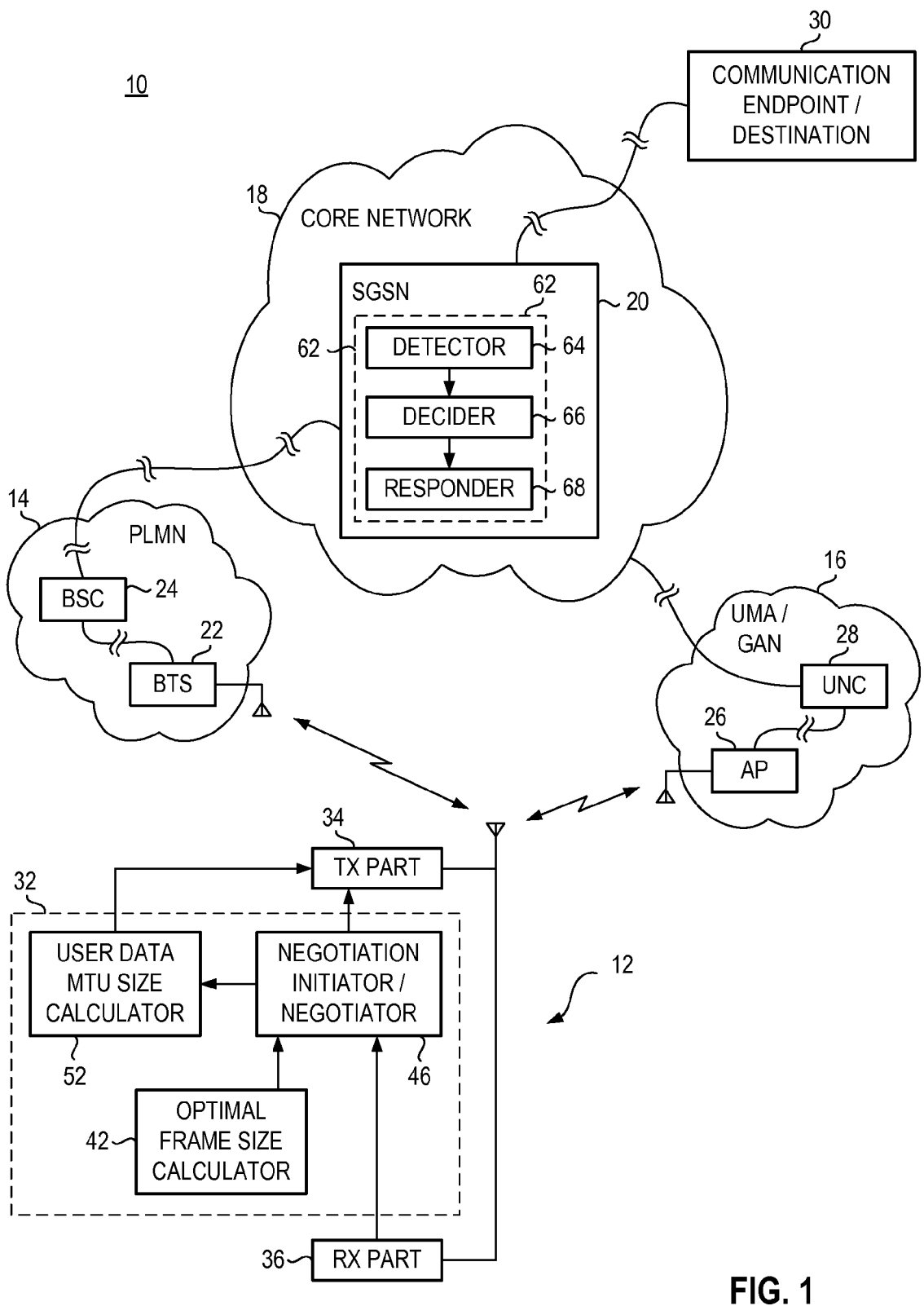
FIG. 1 illustrates a functional block diagram of a radio communication system in which an embodiment of the present invention is operable.

The present invention, accordingly, advantageously provides apparatus, and an associated method, by which to select a frame size of a frame into which communication data is formatted.

Through operation of an embodiment of the present invention, a manner is provided by which to calculate, at a wireless device, an optimal frame size to initiate, by the wireless device, negotiation of the frame size to be used pursuant to data communications.

In one aspect of the present invention, negotiation of the frame size is carried out pursuant to rove-in procedures of a UMA/GAN (Unlicensed Mobile Access/Generic Access Network)-capable mobile station with a network entity, such as the SGSN (Serving GPRS Service Node) of a core network, or other appropriate entity. Through calculation of the desired frame size, and its use pursuant to negotiation of the frame size, improved throughput and efficiency of communications are provided.

In another aspect of the present invention, an optimal frame size calculator is embodied at the wireless device. As part of a rove-in procedure, the optimal frame size is calculated and used pursuant to the negotiation. The optimal frame size is, e.g., a function of an MTU (Maximum Transmission Unit) and logical-layer header sizes. The optimal frame size is, e.g., of a value corresponding to the MTU size less the logical layer header sizes and, additionally, less a maximum IPsec expansion size.

In another aspect of the present invention, upon successful negotiation using the calculated optimal frame size, a user data MTU size is calculated. The calculated, user-data MTU size is, e.g., a function of the allowed frame size, allowed as a result of the successful negotiation and additionally, intervening, logical layer header sizes. The user-data MTU size is calculated, e.g., to be the negotiated frame size, less the intervening logical-layer header sizes. The calculated user-data MTU size defines the packet sizes of the user-data. By constraining the packets to be close to the optimal MTU size, the user data packets are insertable into a single lower, logical layer frame rather than being required to be split into multiple frames. The same informational content, i.e., the user data, is able to be communicated in fewer frames, increasing efficiency and input.

In another aspect of the present invention, the frame-size negotiation, and user-data MTU size calculation are performed as part of a rove-in process and subsequent data communication service. The calculation of the optimal frame size comprises calculation of an optimal LLC frame size. The frame size identifies an N201-U value defined in a 3GPP standard promulgation. The optimal N201-U value is calculated to be the IP bearer MTU less the max IPsec expansion less the IP header size, less the UDP header size, and less the maximum GAN header size. Negotiation is initiated by the wireless device and is carried out as an XID negotiation procedure, also defined in a 3GPP standard promulgation.

In another aspect of the present invention, upon successful negotiation of the N201-U value, the negotiated value is used pursuant to calculation of a user data MTU size to be used by the wireless device pursuant to communication of data by, and to, the wireless device. The calculated, user-data MTU size is calculated to be equal to the allowed, i.e., negotiated N201-U value less a maximum LCC header size less a SNDCP header size. Through use of the calculated, user-data MTU size to define the permitted user-data packet size, the user data packets are of sizes permitting their insertion into, i.e., population of, a single LLC frame is possible. A single user data packet need not therefore be split into multiple LLC frames, and the associated increase in overhead. Improved throughput and data communication efficiency is thereby provided.

In these and other aspects, therefore, apparatus, and an associated method, is provided for a wireless device operable to communicate data. A frame size negotiation initiator is embodied at the wireless device. The frame size negotiation initiator is configured to initiate negotiation of a frame size of a frame into which the data to be communicated is to be formatted. A frame size calculator is embodied at the wireless device. The calculator is configured to calculate a desired frame size of the frame into which the data to be communicated is to be formatted. The desired frame size is used pursuant to negotiation of the frame size subsequent to negotiation initiation by the frame size negotiation initiator.

Referring first, therefore, to FIG. 1, a radio communication system, shown generally at 10, provides for radio communications with wireless devices, of which the mobile station 12 is representative. The illustrated communication system includes network infrastructures of both a PLMN (Public Land Mobile Network) 14 and a UMA/GAN (Unlicensed Mobile Access/Generic Access Network) 16. The UMA/GAN, hereinafter referred to as a GAN, in the exemplary implementation forms a WiFi network. More generally, the network 16 is representative of other GANs including, e.g., WLANs as well as other IP-based, and other, radio networks. And, the PLMN 14, in the exemplary implementation, forms a 3GPP ($3^{rd}$ Generation Partnership Project)-based network. More generally, the network is representative of other types of cellular, and other radio communication systems. The networks 14 and 16 are coupled in communication connectivity by way of a core network 18. The core network includes an SGSN (Serving GPRS Service Node) 20. And, in conformity with network structure defined in a 3GPP network, the network 14 is shown to include a base transceiver station (BTS) 22 and a base station controller (BSC) 24. Also, the UMA/GAN is shown to include an access point (AP) 26 and a UMA/GAN network controller (UNC) 28, also sometimes referred to as a GANC (Generic Access Network Controller). A communication endpoint 30 is further shown in FIG. 1. The communication endpoint is representative of any of various data destinations forming communication nodes used in performance of a communication service.

The mobile station 12 here forms a multi-mode device, capable of communications with both of the networks 14 and 16. Seamless roaming and handover of communications is provided. Rove-in procedures are carried out pursuant to transfer of communications with the PLMN 14 to the GAN 16. And, rove-out procedures are carried out pursuant to transfer, of communications with the GAN to communications with the PLMN. As noted previously, a 3GPP standard promulgation sets forth various protocols relating to interoperability between a 3GPP PLMN and a GAN. The standard promulgations include sections relating to the forwarding of layer 3 packets over an IP connection (e.g., 3GPP Section No. 43.318 and 44.318), segmentation of application level data into SNDCP frames, packaging of SNDCP frames into LLC frames, and of maximum N201-U values (e.g., 3GPP Section 44.064). An existing 3GPP standard promulgation also identifies a default N201-U value of 500 bytes (e.g., 3GPP Section 44.064 8.9.9). And, in a GAN system, a user data LLC frame is packaged into one GA-PSR-UNITDATA frame wherein each GA-PSR frame is sent over an IP link via a UDP packet.

In a WiFi network system of which the GAN 16 forms the network part thereof in the exemplary implementation, a maximum transmission unit, MTU, is defined. Typically, the WiFi MTU is of a value of 1464 bytes. And, to optimize data efficiency, the packet sizes that are communicated are of sizes as close as possible to the MTU value. If, however, the aforementioned default, N201-U value is used, the data efficiency is low. E.g., the data efficiency is only about 50% capacity when the bits required for lower-layer headers are taken into account.

The lack of data efficiency problem is further compounded when the default N201-U value is used as higher-level, application layer packets might be segmented into several SNDCP frames. Each of such SNDCP frames is placed into a single LLC frame that is positioned therebeneath. And, when then transmitted by way of a GAN layer, additional headers are added to each of the LLC frames. By way of example, a 1420 byte application-level packet is split into three SNDCP frames. And, header bits at the GAN, UDP, and IPsec layers add about an additional 180 bytes to each of the three packets, forming a 540 byte overhead.

An embodiment of the present invention provides for the calculation of an optimal N201-U value that increases the data efficiency of data communications as well as permitting initiation of an N201-U value, viz., an LLC frame size. LLC and IP protocols are re-configured to facilitate optimization of the data throughput rate over GAN. Accordingly, the mobile station 12 includes an embodiment of the present invention. The apparatus 32 is coupled to the transceiver circuitry, here represented by a transmit (TX) part 34 and a receive (RX) part 36. The apparatus 32 is formed of functional entities, implementable in any desired manner, including, for instance, by algorithms executable by processing circuitry, hardware components, or combinations thereof. The entities of the apparatus include an optimal frame size calculator 42, a negotiation initiator and negotiator 46, and a user data MTU size calculator 52. The apparatus 32 is operable part of a, or upon start of, a rove-in procedure. And, pursuant to the rove-in procedure, or its start, the optimal frame size calculator 42 calculates an optimal frame size to form an optimal N201-U value. In the exemplary implementation, the calculator calculates the optimal LLC frame size, i.e., the optimal N201-U value according to the equation:

$$N201\text{-}U \text{ value}=(IP \text{ bearer } MTU)-(\text{Max } IPSec \text{ expansion})-(IP \text{ header size})-(UDP \text{ header size})-(\text{Max } GAN \text{ header size})$$

wherein:
IP bearer MTU is the IP layer bearer maximum transmission unit,
Max IPSec expansion is the maximum expansion value of the IP security layer,
IP header size is the header size of the IP layer,
UDP header size is the size of the UDP layer header, and
Max GAN header size is the maximum size of the GAN layer header.

The calculated value calculated by the calculator 42 is provided to the negotiation initiator and negotiator 46. The negotiation initiator operates to initiate a frame size negotiation with the network part of the communication system 10. The negotiation initiator generates one or more messages, at least one of which includes the calculated value calculated by the calculator. The negotiation of the frame size hereby initiated at the mobile station, rather than at the network. The initiator and negotiator 46 is here shown to be coupled to the transmit part 34. The messages formed by the entity 46 are thereby caused to be transmitted by the mobile station to the network.

In the exemplary implementation, the transmitted messages are detected at the PLMN 14 and routed on to the SGSN 20. The SGSN, or other network entity, includes further apparatus 62, of an embodiment of the present invention. The apparatus 62 is also functionally represented, formed of functional entities, implemented in any desired manner, including, for instance, the execution of algorithms by processing devices. Here, the apparatus is shown to include a detector 64, a decider 66, and a responder 68.

The detector operates to detect the negotiation initiation, and other, messages relating to the frame-size negotiation, initiated by the mobile station. In particular, the detector detects a message containing a value of the optimal N201-U value calculated by the calculator 42. The detector provides the detected value of the calculated, optimal N201-U value, and provides an indication thereof to the decider 66. The decider operates to decide whether to accept the optimal N201-U value. If decision is made to accept the calculated N201-U value, calculated at the mobile station, an indication of the acceptance is provided to the responder 68. The responder operates to send a response to the mobile station indicating acceptance of the requested value. In the exemplary implementation, in the event that the requested value is not accepted, the decider decides an alternate N201-U value, and, the alternate value is provided to the responder and the responder sends a message back to the mobile station identifying the alternate N201-U value. The requested, or alternate, N201-U value forms the allowed N201-U value.

In the exemplary implementation, the response message formed by the responder is routed through the PLMN, sent to the mobile station by way of a radio air interface defined between the network and the mobile station, detected by the receive part 36 of the mobile station, and provided to the initiator and negotiator 46. The value, forming the negotiated value, is provided to the user data MTU size calculator 52. The calculator calculates the user data MTU size according to the following equation:

$$\text{User data } MTU \text{ size}=(N201\text{-}U)-(\text{Max } LLC \text{ header size})-(\text{Max } SNDCP \text{ header size})$$

wherein:
The N201-U value is the negotiated N201-U value,
The Max LLC header size is the maximum size of the LLC header, and
The Max SNDCP header size is the maximum size of the SNDCP header.

The calculated value is used pursuant to formatting of the user data, and the calculated value is here shown to be provided to the transmit part 34. By constraining the packets to be close to the optimal MTU size, the throughput and efficiency of the connection is, as a result, significantly increased.

Figure 2:
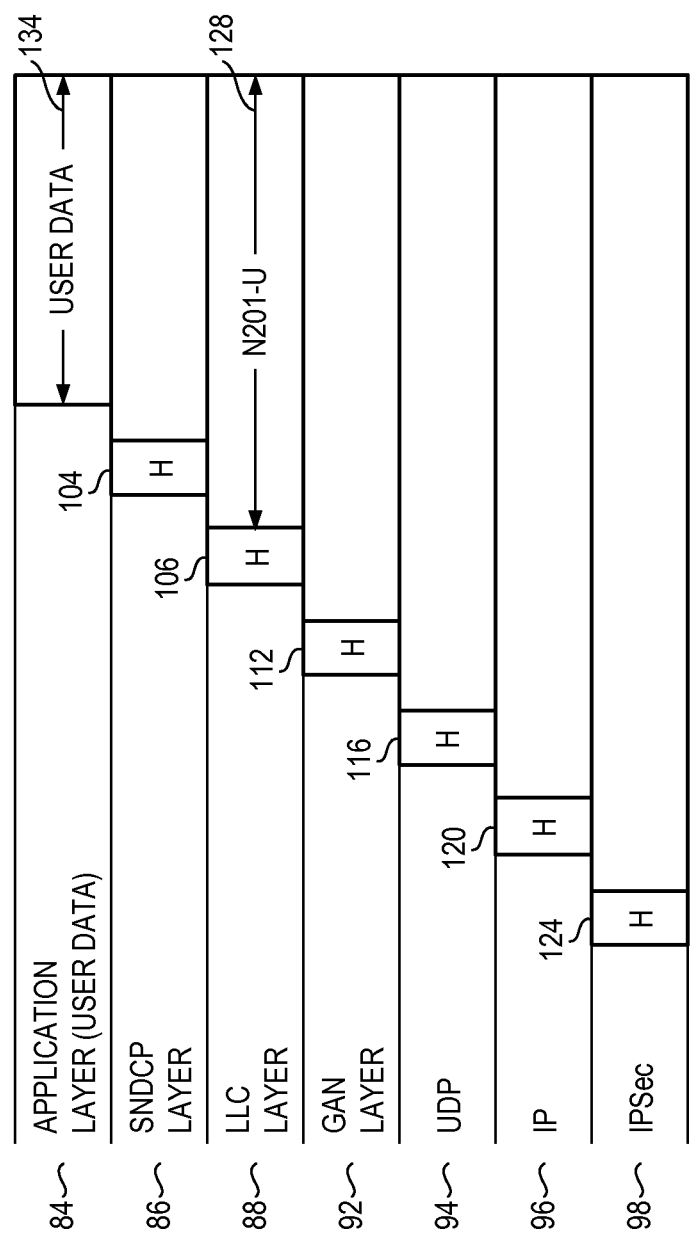
FIG. 2 illustrates a representation of various of the logical levels defined in the communication system shown in FIG. 1 and that illustrates packet segmentation at the various logical levels.

Turning next to FIG. 2, a representation shown generally at 82, shows various of the logical levels defined in the communication system 10, shown in FIG. 1. The illustrated logical levels include an application layer 84, an SNDCP layer 86, an LLC layer 88, a GAN layer 92, a UDP layer 94, an IP layer 96, and an IPsec layer 98. Details associated with the respective layers are set forth in specification standards relating to the various parts of the communication system. Review of the representation illustrates frames defined at various of the logical layers, each including spare parts. That is to say, an SNDCP-layer frame includes a header part 104, an LLC-layer frame includes a header part 106, a GAN-layer frame includes a header part 112, a UDP-layer frame includes a header part 116, an IP-layer frame includes a header part 120, and an IPsec-layer frame includes a header part 124.

Of significance to operation described herein, is the frame length, i.e., the N201-U value, represented at 128, at the LLC layer 88. The calculation of the optimal N201-U value, noted above to be performed by the calculator 42, shown in FIG. 1, takes into account the overhead, e.g., the header parts, of the structures formed at the layers beneath the LLC layer. Additionally, FIG. 2 illustrates the MTU size 134 of the user data formed at the application layer 84. This size takes into account the overhead, e.g., the header parts 104 and 106 at the SNDCP and LLC layers 86 and 88. And, the MTU size takes into account the N201-U value 128. The MTU size 134 is constrained to be close to an optimal size, thereby to improve the resultant throughput and efficiency of operation of data communication pursuant to performance of a communication service.

Figure 3:
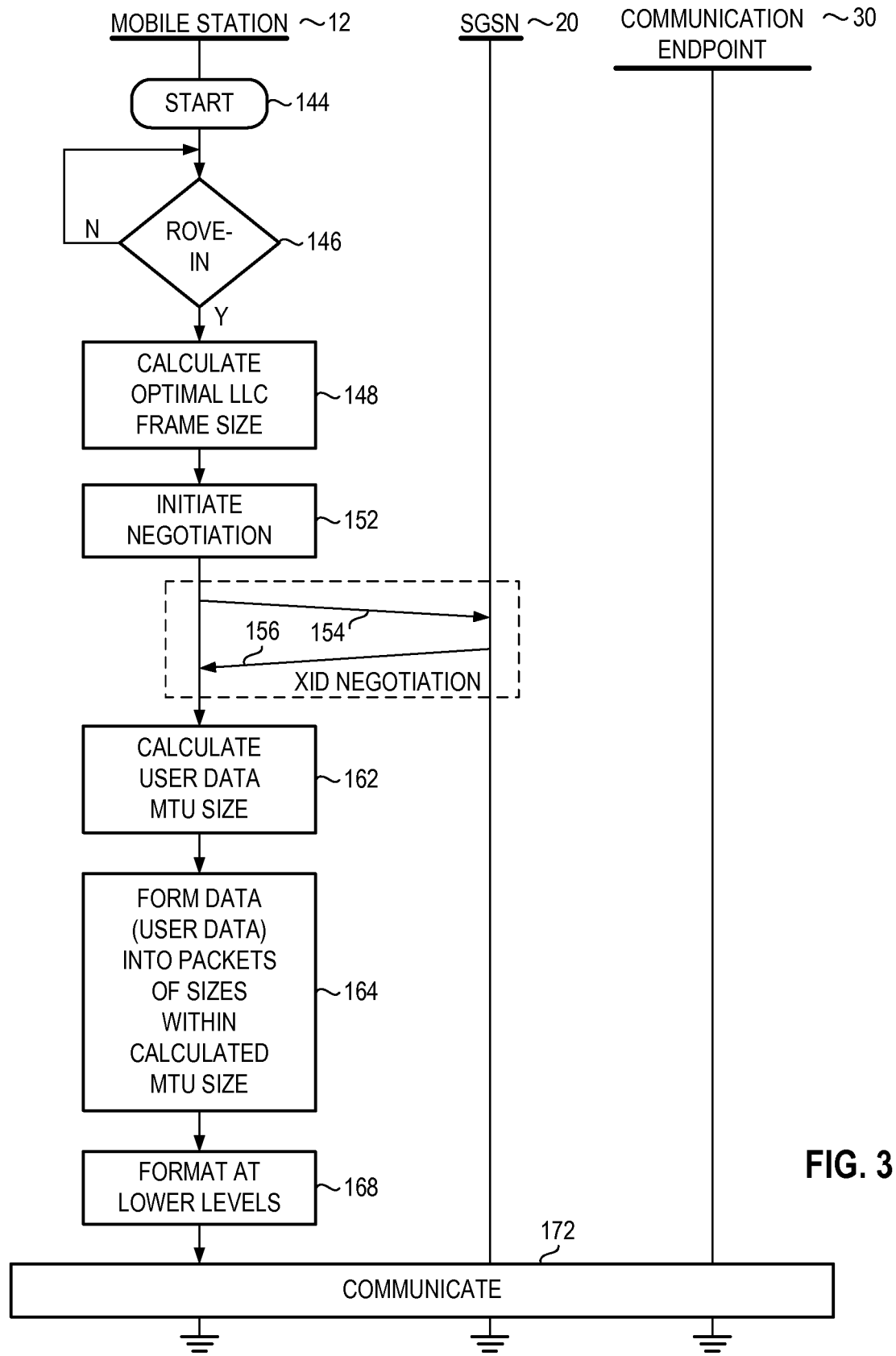
FIG. 3 illustrates a process diagram representative of the process of an embodiment of the present invention.

FIG. 3 illustrates a process diagram 142, representative of the process of operation of an embodiment of the present invention. Operation commences at the mobile station 12 with the start block 144. A determination is made, as indicated by the decision block 146, as to whether a rove-in procedure is to commence. If not, the no branch is taken back to the decision block. If, conversely, rove-in is to proceed, the yes branch is taken to the block 148. At the block 148, an optimal LLC frame size is calculated. Then, and as indicated by the block 152, negotiation of an allowable frame size commences, initiated at the mobile station.

The segment 154 is representative of a message sent by the mobile station to the SGSN 20 that identifies the calculated, optimal frame size, i.e., the N201-U value. The message is sent as part of an XID negotiation, set forth in a 3GPP operating specification. Detection, decision, and response is made at the SGSN, and a response message, indicated by the segment 156, is returned to the mobile station. The response message allows the calculated value to be used or provides an alternate value.

Then, and as indicated by the block 162, the user data MTU size is calculated, making use of the allocated N201-U value. Then, and as indicated by the block 164, user data is formed into packets of sizes within the calculated MTU size. And, as indicated by the block 168, the data is formatted further at lower logical layers. The block 172 is representative of communication of data between the mobile station and a communication endpoint in which user data of packets of sizes within the calculated MTU size are utilized. The same sizing is used at both the mobile station and the communication endpoint when communications are bi-directional.

Figure 4:
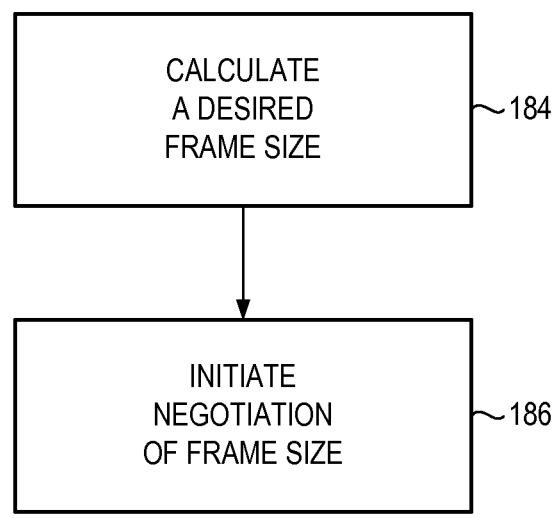
FIG. 4 illustrates a method flow diagram representative of the method of operation of an embodiment of the present invention.

FIG. 4 illustrates a method flow diagram, shown generally at 182, representative of the method of operation of an embodiment of the present invention. The method facilitates communication of data by a wireless device.

First, and as indicated by the block 184, a desired frame size is calculated at the wireless device. The desired frame size is the desired size of the frame into which the data to be communicated is to be formatted. Then, and as indicated by the block 186, a frame-size negotiation is initiated at the wireless device of a frame size of a frame into which the data to be communicated is to be formatted.

Through operation of the method of an embodiment of the present invention, increased data throughput and communication efficiency is provided.

Presently preferred embodiments of the invention and many of its improvements and advantages have been described with a degree of particularity. The description is of preferred examples of implementing the invention, and the description of preferred examples is not necessarily intended to limit the scope of the invention. The scope of the invention is defined by the following claims.

What is claimed is:

1. Apparatus for a wireless device operable to communicate data, in a radio communication system having a PLMN "Public Land Mobile Network) and a GAN (Generic Access Network) said apparatus comprising:
    a communication transferor configured to determine a need for rove-in from the PLMN to the GAN;
    a frame size calculator embodied at the wireless device and configured to calculate an optimum Logical Link Control (LLC) frame size of a frame into which the data to be communicated is to be formatted, upon a determination that a rove-in by the wireless device is needed;
    a frame size negotiation initiator embodied at the wireless device, configured to initiate a frame size negotiation of the frame into which the data to be communicated is to be formatted, and configured to initiate the negotiation of the frame size upon a determination that a rove-in by the wireless device to the GAN is needed, the frame-size negotiation utilizing the optimum LLC frame size calculated by said frame size calculator;
    a receiver that receives a response message returned to the wireless device from the PLMN identifying one of the optimum LLC frame size and an alternate LLC frame size to be used;
    a calculator that calculates a user data MTU size based on the identified one of the optimum LLC frame size and the alternate LLC frame size; and
    a packet former that forms user data into packets of sizes within the calculated MTU size.

2. The apparatus of claim 1 wherein the data to be communicated by the wireless device comprise application level data and wherein the frame, the desired frame size of which is calculated by said frame size calculator, includes a payload part populatable with the application level data.

3. The apparatus of claim 1 wherein the negotiation of the frame size initiated by said frame size negotiation initiator comprises a Third Generation Partnership Project-compliant (3GPP-compliant) network negotiation.

4. The apparatus of claim 1 wherein the MTU comprises a 1464 byte size.

5. The apparatus of claim 1 wherein the optimum LLC frame size calculated by said frame size calculator comprises a Wireless Fidelity (WiFi) Network MTU.

6. The apparatus of claim 1 wherein the optimum LLC frame size calculated by said frame size calculator is a value of the MTU less a logical layer header size.

7. The apparatus of claim 6 wherein the logical layer header size further comprises a Sub Network Dependent Convergence Protocol (SNDCP) header size.

8. A method for facilitating communication of data by a wireless device in a radio communication system having a PLMN (Public Land Mobile Network) and a GAN (Generic Access Network), said method comprising the operations of:
    determining, at the wireless device, a need for rove-in from the PLMN to the GAN;
    calculating in response to a determined need to rove-in, at the wireless device, an optimum Logical Link Control (LLC) frame size of a frame into which the data to be communicated is to be formatted; and
    initiating, at the wireless device, upon a determination that a rove-in by the wireless device to the GAN is needed, a frame-size negotiation of the frame size of a frame into which data to be communicated is to be formatted, the frame-size negotiation utilizing the optimum LLC frame size calculated during said calculating;
    receiving a response message returned to the wireless device from the PLMN identifying one of the optimum LLC frame size and an alternate LLC frame size to be used;
    calculating a user data MTU size based on the identified one of the optimum LLC frame size and the alternate LLC frame size; and
    forming user data into packets of sizes within the calculated MTU size.

9. The method of claim 8 wherein the optimum LLC frame size calculated during said operation of calculating an optimum LLC is a function of a Generic Access Network MTU.

10. The method of claim 8 wherein the optimum LLC frame size calculated during said operation of calculating an optimum LLC is of a size permitting the data to be communicated to be assigned to a single frame.

11. A method for Logic Link Control (LLC) layer negotiation by a multi-mode wireless device, said method comprising the operations of:

deciding a roving-in procedure from a PLMN (Public Land Mobile Network) to a GAN (Generic Access Network) is to commence;

calculating an optimal value at the LLC layer;

upon said rove-in decision, transmitting a negotiation message to the PLMN comprising the calculated optimal value at the LLC layer, wherein the LLC layer optimal value comprises an Internet Protocol (IP) bearer Maximum Transmission Unit (MTU) of the second network minus a plurality of header sizes and minus an IP Security (IPSec) expansion size;

receiving a negotiation message response message from the PLMN that identifies one of the optimum value at the LLC layer and an alternate value at the LLC layer; and calculating a user data MTU size based on the identified one of the optimum value at the LLC layer and an alternate value at the LLC layer reduced by at least a maximum LLC header size.

12. The method of claim 11, wherein the PLMN is a Third Generation Partnership Project (3GPP) network.

13. The method of claim 11, wherein the GAN is a Wireless Fidelity (WiFi) network.

14. The method of claim 11, wherein the optimal value is an N201-U value.

15. The method of claim 14, wherein the plurality of header sizes comprises a max IP header size, a max UDP header size, and a max GAN header size, and a max LLC header size.

* * * * *